United States Patent Office 2,954,932
Patented Oct. 4, 1960

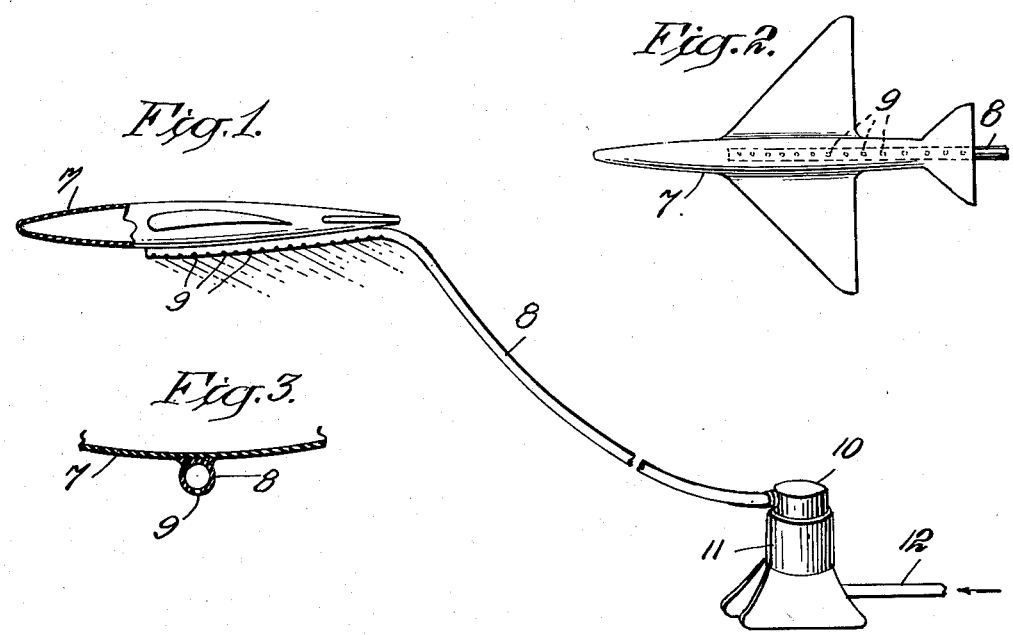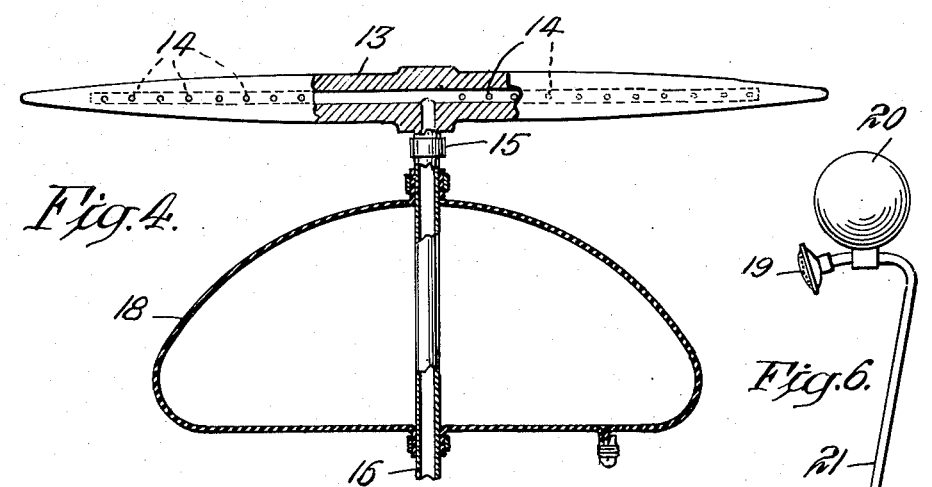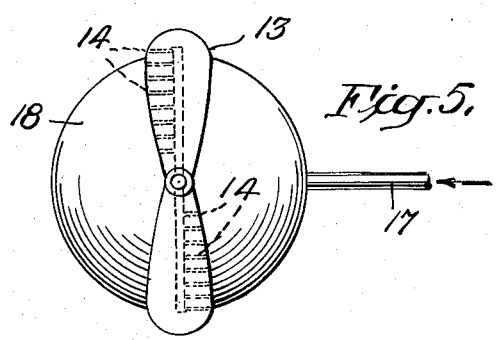

2,954,932

AERIAL SPRINKLER

Alphonso Frank Albano, 51 N. Clinton St.,
Poughkeepsie, N.Y.

Filed Oct. 8, 1957, Ser. No. 688,904

1 Claim. (Cl. 239—188)

The invention which is here disclosed relates to devices for spraying liquid or possibly gaseous fluids.

Such devices may find usefulness in the irrigation of lawns and gardens or for spraying insecticides, antiseptics or the like.

Objects of the invention are to provide a self-circulating form of sprinkler which will sustain itself and circulate in an ambient path so as to cover a more or less extended area.

Other objects of the invention are to provide a sprinkler having these charcteristics which will be of relatively simple and inexpensive construction and adaptable for use with conventional supply equipment such as an ordinary garden hose or the like.

Briefly considered, one embodiment of the invention may be said comprise a lighter than air flying support and fluid supply connections extended to said support, and including a fluid conducting swivel and flexible tubing extending from said swivel to the flying support terminating in jet producing outlets directed to induce or impart travel to the jet carrying support.

Other features of the invention and objects accomplished by the same are set forth in and will appear from the following specification.

The drawing accompanying and forming part of the specification illustrates present practical embodiments of the invention, but it will be appreciated that structure may be further modified and changed all within the true intent and scope of the invention as hereinafter defined and claimed.

Fig. 1 in the drawing is a broken part sectional side elevation view illustrating the sprinkler in the form of a jet airplane.

Fig. 2 is a broken top plan view of the same.

Fig. 3 is an enlarged broken sectional detail showing the jet tube on the underside of the airplane body.

Fig. 4 is a broken vertical sectional view of a helicopter form of the invention embodying a jet operated helicopter propeller sustained by a balloon form of support.

Fig. 5 is a broken top plan view of the same.

Fig. 6 is a side elevation showing the sprinkler in the form of a shower head supported by a balloon.

In Fig. 1, the supporting or sustaining body is shown in the form of a balloon 7 shaped to resemble a jet airplane, having attached to the underbody of the same flexible tubing 8 having downwardly and rearwardly directed jet producing outlets 9.

Flexible tubing 8 is shown connected to the rotating swivel head 10 of a water supply fixture 11. The latter may be such as used for ordinary lawn sprinklers supplied from a fixed outlet by hose 12.

The flying support 7 is of sufficient size and buoyancy to lift a desired length of flexible tubing and the latter may be light and small enough for the balloon to properly support the same. The swivel may be of light, easily rotated construction so as to readily turn under the pull exerted by the flexible tubing.

The jets 9 may be sufficient in number to create desired motion and directed downwardly, they may assist in the levitation of the flying support.

The balloon structure may be inflated with helium or other like gas.

The jets may be located at different points in the underbody or wing structure and may be located just in the tail portion of the flying support. These jets may be inclined to produce various different directions of flight, for example, in a generally circular path so as to cover as much area as desired.

While usually intended for water distribution, it is realized that the invention may be used for dissemination of gaseous fluids for various purposes.

In the helicopter form of the invention illustrated in Figs. 4 and 5, a hollow propeller 13 having rotation inducing jet openings 14 in the trailing edges of the same is journalled at 15 on the upper end of light tubing 16 which is connected with the flexible supply tubing 17 extending from the swivel or other supply source.

A balloon element 18 which may be made to resemble a flying saucer is mounted on the propeller carrying tubing 16, this flying support being related to the propeller to provide necessary or desirable sustenance.

Fig. 6 illustrates a variation of the invention in which a water sprinkler head 19 is sustained by a balloon 20, the sprinkler head being supplied through flexible tubing 21 from the swivel 22.

What is claimed is:

A sprinkler of the character disclosed comprising an airborne support having downwardly directed jets inclined to levitate and propel said support in airborne relation, flexible tubing extending to the jets on said airborne support and means for supplying sustentation and propulsion fluid through said flexible tubing to said jets including water supply connections terminating in a ground supported swivel, said flexible tubing being connected with said swivel to thereby supply water for sustaining and propelling said support in a circular area about said ground swivel with the downwardly directed jets sprinkling said circulated area about the swivel.

References Cited in the file of this patent

UNITED STATES PATENTS

| | | |
|---|---|---|
| 426,169 | Chapman | Apr. 22, 1890 |
| 1,099,083 | Duc | June 2, 1914 |
| 2,064,072 | McArdle | Dec. 15, 1936 |
| 2,476,678 | Miller | July 19, 1949 |
| 2,484,468 | Schaad | Oct. 11, 1949 |
| 2,634,165 | Murphy | Apr. 7, 1953 |
| 2,690,930 | Corson | Oct. 5, 1954 |
| 2,757,959 | Williams | Aug. 7, 1956 |
| 2,783,584 | Ferturella | Mar. 5, 1957 |
| 2,791,466 | Crisp | May 7, 1957 |